(12) United States Patent
Jiencke

(10) Patent No.: US 9,914,062 B1
(45) Date of Patent: Mar. 13, 2018

(54) WIRELESSLY COMMUNICATIVE CUDDLY TOY

(71) Applicant: Laura Jiencke, New York, NY (US)

(72) Inventor: Laura Jiencke, New York, NY (US)

( * ) Notice: Subject to any disclaimer, the term of this patent is extended or adjusted under 35 U.S.C. 154(b) by 5 days.

(21) Appl. No.: 15/262,181

(22) Filed: Sep. 12, 2016

(51) Int. Cl.
| | |
|---|---|
| A63H 3/28 | (2006.01) |
| A63H 3/00 | (2006.01) |
| A63H 3/02 | (2006.01) |
| A63H 13/00 | (2006.01) |
| A63H 29/22 | (2006.01) |
| A63H 33/26 | (2006.01) |
| G09B 5/04 | (2006.01) |
| G09B 17/00 | (2006.01) |
| H04B 5/00 | (2006.01) |

(52) U.S. Cl.
CPC ............... *A63H 3/28* (2013.01); *A63H 3/006* (2013.01); *A63H 3/02* (2013.01); *A63H 13/005* (2013.01); *A63H 29/22* (2013.01); *A63H 33/26* (2013.01); *G09B 5/04* (2013.01); *G09B 17/006* (2013.01); *H04B 5/0025* (2013.01); *A63H 2200/00* (2013.01)

(58) Field of Classification Search
CPC ....... G09B 5/04; G09B 17/006; H04B 5/0025
See application file for complete search history.

(56) References Cited

U.S. PATENT DOCUMENTS

| | | | |
|---|---|---|---|
| 6,264,523 B1 | 7/2001 | Simmons | |
| 6,497,607 B1 * | 12/2002 | Hampton | ................. A63H 3/28 446/298 |
| 6,565,407 B1 * | 5/2003 | Woolington | ............. A63H 3/28 446/175 |
| 6,793,553 B2 * | 9/2004 | Willett | ................... A63H 3/365 446/301 |
| 6,800,013 B2 | 10/2004 | Liu | |
| 7,137,861 B2 | 11/2006 | Carr et al. | |
| 7,189,137 B2 * | 3/2007 | Ellman | .................... A63H 3/24 446/304 |
| 8,568,189 B2 | 10/2013 | Garbos et al. | |
| 8,583,596 B2 | 11/2013 | Fong et al. | |
| 8,636,558 B2 | 1/2014 | Eyzaguirre et al. | |
| 9,108,115 B1 | 8/2015 | Fung | |
| 2004/0186623 A1 | 9/2004 | Dooley et al. | |

(Continued)

FOREIGN PATENT DOCUMENTS

CN 101820399 A 9/2010

*Primary Examiner* — Jay Liddle
*Assistant Examiner* — Alex F. R. P. Rada, II
(74) *Attorney, Agent, or Firm* — Williams Intellectual Property; Benjamin F. Williams

(57) ABSTRACT

A wirelessly communicative cuddly toy including a stuffed animal toy having a motorized, articulated robotic interior member disposed therein surrounded by flocculent stuffing material. The robotic interior member includes a transceiver wirelessly communicable by NFC protocol with any appropriate peripheral device. An articulated head member is disposed upon the robotic interior member and configured to animate a mouth of the stuffed animal toy when a speaker, disposed to play audio signals relayed by the transceiver, is activated. Audio executed on the peripheral device is thus playable through the speaker on the robotic interior member and the articulated head member animates the stuffed animal toy in simulation of verbal communication with a user.

16 Claims, 9 Drawing Sheets

(56) References Cited

U.S. PATENT DOCUMENTS

| | | | |
|---|---|---|---|
| 2004/0229696 A1* | 11/2004 | Beck | A63F 13/02 |
| | | | 463/40 |
| 2007/0060020 A1 | 3/2007 | Civettini et al. | |
| 2007/0128979 A1* | 6/2007 | Shackelford | A63H 3/001 |
| | | | 446/484 |
| 2008/0014831 A1* | 1/2008 | Rettberg | A63H 3/365 |
| | | | 446/301 |
| 2009/0111352 A1 | 4/2009 | Hui | |
| 2010/0041304 A1 | 2/2010 | Eisenson | |
| 2011/0009175 A1 | 1/2011 | Raichman et al. | |
| 2011/0021109 A1 | 1/2011 | Le et al. | |
| 2011/0230116 A1 | 9/2011 | Balik | |
| 2012/0295510 A1* | 11/2012 | Boeckle | A63H 3/28 |
| | | | 446/72 |
| 2013/0078600 A1* | 3/2013 | Fischer | G09B 19/00 |
| | | | 434/236 |
| 2013/0130587 A1 | 5/2013 | Cohen et al. | |
| 2013/0288563 A1 | 10/2013 | Zheng et al. | |
| 2014/0011423 A1 | 1/2014 | Wong Simmons | |
| 2014/0038489 A1* | 2/2014 | Sharma | A63H 30/04 |
| | | | 446/175 |
| 2014/0178847 A1* | 6/2014 | Akavia | G09B 19/00 |
| | | | 434/308 |
| 2015/0065258 A1* | 3/2015 | Meade | A63F 13/235 |
| | | | 463/43 |
| 2016/0184724 A1* | 6/2016 | Butler | A63H 3/36 |
| | | | 446/484 |

* cited by examiner

WIRELESSLY COMMUNICATIVE CUDDLY TOY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of communicative toys are known in the prior art. Most enable emission of standardized responses selected at random when activated by a user. What is needed is a wirelessly communicative cuddly toy devised to assist children in learning to read that includes a stuffed animal toy having a motorized, articulated robotic interior member disposed therein surrounded by flocculent stuffing material. The robotic interior member includes a transceiver wirelessly communicable by Near Field Communication ("NFC") protocol with any appropriate peripheral device.

An articulated head member is disposed upon the robotic interior member configured to animate a mouth of the stuffed animal toy, and engender motion of a torso of the stuffed animal toy, anytime a speaker, disposed to play audio signals relayed by the transceiver, is activated.

Audio executed on the peripheral device is thus playable through the speaker on the robotic interior member and the robotic interior member effects animation of the stuffed animal toy in simulation of verbal communication with a user. A child is thereby enabled to listen to an audio book, for example, while following along with the accompanying text displayable upon the peripheral device.

FIELD OF THE INVENTION

The present invention relates to a wirelessly communicative cuddly toy, and more particularly, to a wirelessly communicative cuddly toy including a stuffed animal toy having a motorized, articulated robotic interior member disposed therein surrounded by flocculent stuffing material. The robotic interior member includes a transceiver wirelessly communicable with any appropriate peripheral device. An articulated head member is disposed upon the robotic interior member and configured to animate a mouth of the stuffed animal toy when a speaker, disposed to play audio signals relayed by the transceiver, is activated. The robotic interior member further includes an elongate central portion configured to effect movement of a torso of the stuffed animal toy in synchrony articulated head member, whereby gesture and speech is affected.

Audio executed on the peripheral device is thus playable through the speaker on the robotic interior member and the articulated head member and elongate central portion animate the stuffed animal toy in simulation of verbal communication with a user.

Various embodiments of the stuffed animal toy are contemplated, including, for example, animal characters. Particular audio files, and particular iterations of audio files made with voices appropriate to each of said animal characters is likewise contemplated as part of this invention. Children are thus enabled increased enjoyment and focus in listening to an audio book or other story relayed through the stuffed animal toy and are encouraged and inspired to read along with text simultaneously displayable upon the peripheral device. Enhanced learning to read is thereby encouraged and effective.

SUMMARY OF THE INVENTION

The general purpose of the wirelessly communicative cuddly toy, described subsequently in greater detail, is to provide a wirelessly communicative cuddly toy which has many novel features that result in a wirelessly communicative cuddly toy which is not anticipated, rendered obvious, suggested, or even implied by prior art, either alone or in combination thereof.

The present wirelessly communicative cuddly toy has been devised to assist children in learning to read. The present wirelessly communicative cuddly toy syncs via Near Field Communication ("NFC") protocol with an appropriate peripheral device when sensed proximal thereto, whereby audio executed on the peripheral device is playable through a speaker disposed interior a stuffed animal toy and a facial portion of the toy appears to move in semblance of speech. Thus the stuffed animal toy appears to be reading to a child, which child is enabled to follow along with the text displayable upon the peripheral device.

The term "peripheral device", as used herein throughout, is taken to include any portable computing apparatus capable of establishing a wireless connection with a remotely disposed transceiver whereby audio files executed upon the peripheral device are playable through a speaker connected in circuit with the transceiver.

The term "peripheral device", then, is taken to include handhelds, smart phones, tablets, laptops, and any other portable computing apparatuses running at least one processor and communicable with remote circuitry by NFC protocol.

The term "stuffed animal toy", as used herein throughout, is taken to include any toy having flocculent material stuffed interior thereto whereby the toy is compressible, squishy, comfortable and yielding, or otherwise suitable for cuddling by a child. It should be recognized by anyone having skill in the art that the particular form of the stuffed animal toy (as a bear, lion, zebra, sheep, monkey, or other animal, for example) is not set forth restrictively, but as exemplary disclosure whereby the present metes and bounds of the inventive subject matter are better discerned.

The present wirelessly communicative cuddly toy, therefore, includes a stuffed animal toy filled with flocculent stuffing material and having at least a facial portion, a mouth, and a torso. A robotic interior member is disposed interior to the stuffed animal toy, and surrounded therein by the flocculent stuffing material. The robotic interior member, which is not necessarily yielding, as containing circuitry and motorized parts, is thus surrounded by flocculent stuffing material whereby the squishiness of the stuffed animal toy is not appreciably affected beyond a threshold of comfort enjoyable by a child.

The interior robotic member includes an elongate central portion, disposed centrally and vertically interior to the torso of the stuffed animal toy. The elongate central portion includes an uppermost end and a lowermost end. An articulated head member is disposed at the uppermost end, there engaged with the facial portion of the stuffed animal toy. The articulated head member includes an ovoid anterior lobe, disposed to house a first electric motor, appendant circuitry, and memory for sounding of a welcome message when the present wirelessly communicative cuddly toy is initially activated, as will be described subsequently. A snout member is disposed anteriorly projected from the anterior lobe, said snout member disposed to maintain shape of the facial portion. A hinged jaw member is articulated underlying the snout portion, and disposed thereat to move the mouth of the stuffed animal toy in the manner as will be described herein below.

The first electric motor is disposed interiorly within the anterior lobe to rotationally engage an axle member. The axle member communicates rotary motion to a lever arm controlling movement of the hinged jaw member in each of a first and second direction, whereby the hinged jaw member is moveable between a raised position, abutting the snout member, and a lowered position, angled obtusely away from the snout member. Movement of the hinged jaw member, coordinated with sounding of the speaker, manipulates the mouth of the stuffed animal toy, whereby the act of speech is simulated.

The speaker member is disposed in the anterior lobe, whereby audio played therethrough appears to emanate from the facial portion of the stuffed animal toy, and greater verisimilitude in affecting speech is maintained. The motor is disposed in communication with the speaker, whereby electrical current is supplied to drive the motor synchronized with the sounding of the speaker, whereby movement of the hinged jaw member appears coordinated with the audio played through the speaker.

The elongate central portion of the robotic interior member further includes a spherical member disposed at the lowermost end. The spherical member is disposed seated interior to a base member, said base member devised to accommodate the spherical member and enable rotation of the spherical member therein. The base member includes an interior surface, adapted to surround the spherical member, whereon a first and second pocket are diametrically disposed.

The spherical member includes a discoid first rotational element disposed upon one side thereof. The first rotational element is disposed in operational communication with a gear pulley, disposed upon the elongate central portion, which gear pulley is likewise disposed in operational communication with a second electric motor disposed interior to the elongate central portion. Action of the second electric motor revolves another axle member whereby the gear pulley translates the rotary motion of the axle member through at least two gears and thence proportionately to the first rotational element, which is thereby caused to revolve at a distinct speed relative the axle member.

The first rotational element includes a first circumferential protuberance, disposed projected transversely from the first rotational element right-angularly from the first rotational element, in a position proximal the circumference of the first rotational element. The first circumferential protuberance of the first rotational element is disposed rotatably engaged interior to the first pocket disposed upon the interior surface of the base member.

A second rotational element is likewise disposed upon the other side of the spherical member, diametrically opposite the first rotational element. The second rotational element also includes a second circumferential protuberance right-angularly projected proximal the circumference of said second rotational element. The second circumferential protuberance is disposed rotatably seated interior to the second pocket upon the interior surface of the base member, said second circumferential protuberance disposed in a relative position upon the second rotational element diametrically opposed to the relative position of the first circumferential protuberance upon the first rotational element. Rotation of each of the first and second rotational elements thus revolves each of the first and second circumferential protuberances between an uppermost position (at an acme of the circular motion) and a lowermost position (at a nadir of the circular motion). When the first circumferential protuberance reaches the uppermost position, the second circumferential protuberance reaches the lowermost position. The spherical member is thus rotated interior to the base member, and the central elongate portion is moved to a maximum first side position. As the first and second rotational elements are further revolved, the second circumferential protuberance is moved to the uppermost position and the first circumferential protuberance is simultaneously moved to the lowermost position, whereby the central elongate portion is moved to a maximum second side position. Revolution of each of the first and second rotational elements upon the spherical member thus effects oscillation of the elongate central portion between each of the maximum first side position and the maximum second side position whereby the torso of the stuffed animal toy is perceived to move when the second electric motor is activated.

Activation of the second electric motor is effected in conjunction to sounding of the speaker, whereby oscillation of the elongate central portion, and thereby movement of the torso of the stuffed animal toy, is coordinated with audio played through the speaker. The semblance of speech is thus strengthen by associated movement of the torso of the stuffed animal toy synchronized with the movement of the mouth affecting speech.

The present wirelessly communicative cuddly toy is powerable by a rechargeable cell distally disposed interior to an interconnect housing. The interconnect housing includes an exposed portion accessible to a user interior to a rear pocket upon the torso of the stuffed animal toy. A charge port is disposed upon the exposed portion and configured for interconnection with a power source whereby the rechargeable cell is rechargeable. In the example embodiment herein depicted, the charge port is a micro Universal Serial Bus ("USB") port, whereby charging of the device is enabled by USB cable connected with a power source, as is common to the present state of the art. A switch is likewise disposed upon the exposed portion, said switch moveable between a first position and a second position whereby the robotic interior member is alternately activated and deactivated, as desired.

The wirelessly communicative cuddly toy includes a welcome message when initially activated, whereby a user is informed to connect the wirelessly communicative cuddly toy with a proximal peripheral device. Once connection is established, a confirmation message is played. The welcome message may include an introduction of the stuffed animal toy, wherein it appears as if the stuffed animal toy is introducing itself to the user previous to establishing a connection with a proximal peripheral device. Once connection has been established, audio executed upon the peripheral device is communicable to the transceiver disposed interior to the stuffed animal toy for play through the speaker.

A child, therefore, is enabled to open an audio file, such as an audio book, for example, upon the peripheral device, and then listen to a story apparently read by the present wirelessly communicative cuddly toy. Any text reader existing upon the peripheral device, that readily converts text to audio, is likewise playable through the wirelessly communicative cuddly toy.

It is contemplated as part of this invention that particular stories be available as audio files specifically devised for use with individual stuffed animal toys of the present wirelessly communicative cuddly toy whereby different voices and personalities may be affected in reading a particular story. A child may thus select a particular stuffed animal toy (or version of a story particularly devised for reading by a particular stuffed animal toy) and then follow along on the peripheral device as the stuffed animal toy reads the story according to the personality (and voice) selected.

Thus has been broadly outlined the more important features of the present wirelessly communicative cuddly toy so that the detailed description thereof that follows may be better understood and in order that the present contribution to the art may be better appreciated.

Objects of the present wirelessly communicative cuddly toy, along with various novel features that characterize the invention are particularly pointed out in the claims forming a part of this disclosure. For better understanding of the wirelessly communicative cuddly toy, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
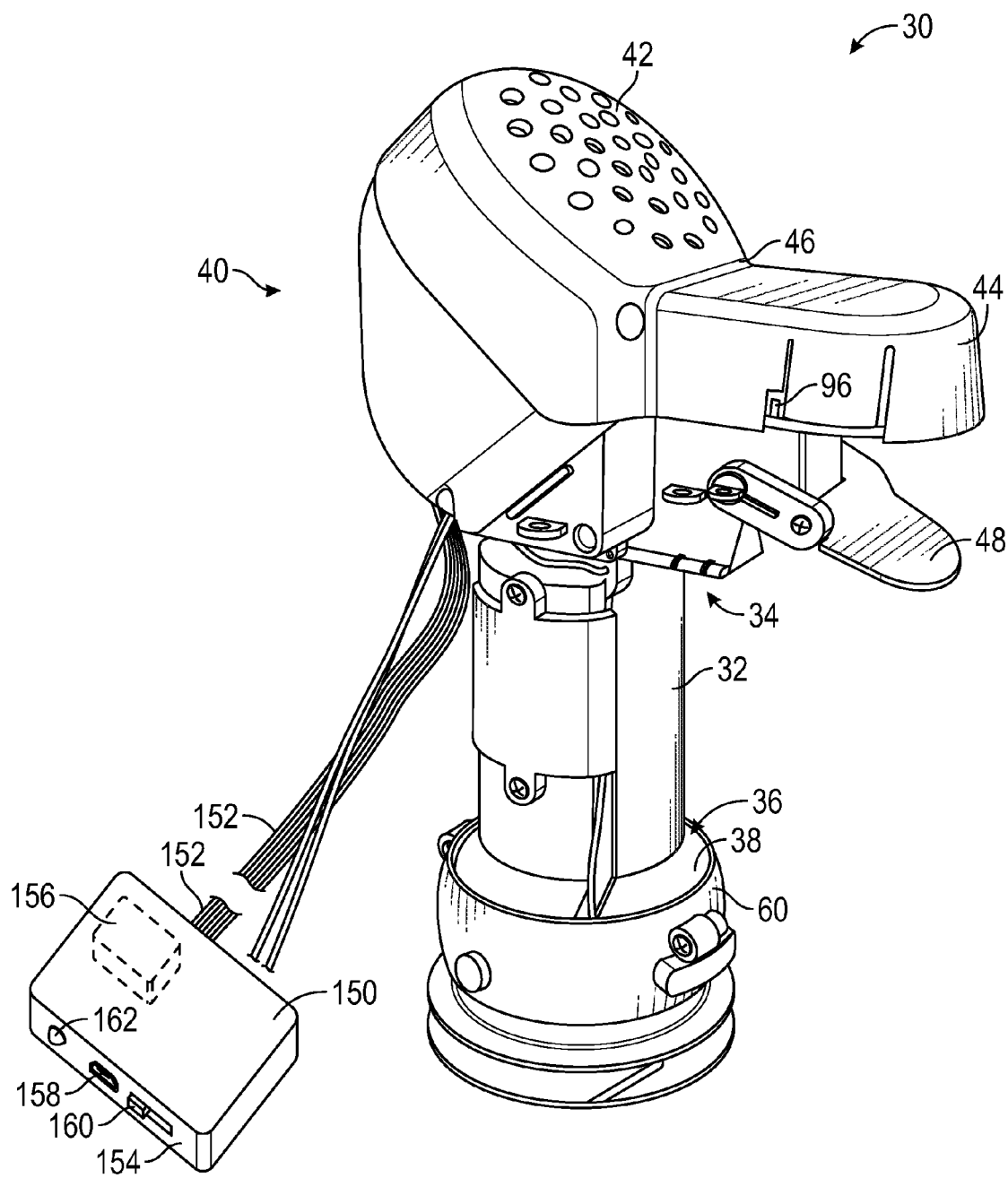
FIG. 1 is an elevation view of an example embodiment of a robotic interior member.

With reference now to the drawings, and in particular FIGS. 1 through 10 thereof, example of the instant wirelessly communicative cuddly toy employing the principles and concepts of the present wirelessly communicative cuddly toy and generally designated by the reference number 10 will be described.

Referring to FIGS. 1 through 10 a preferred embodiment of the present wirelessly communicative cuddly toy 10 is illustrated.

The present wirelessly communicative cuddly toy 10 has been devised to remotely sync with a peripheral device 100 via Near Field Communication ("NFC") protocol, to play audio files, and emulate verbal communication with a child. The present wirelessly communicative cuddly toy 10 emulates speech and gesture, by motorized movements effected in synchrony with the sounding of a speaker concealed within the wirelessly communicative cuddly toy. A user may, therefore, play an audio book upon a peripheral device, for example, whereby the wirelessly communicative cuddly toy appears to read the book to the user while the user follows along on the peripheral device.

The wirelessly communicative cuddly toy, therefore, enables assisted reading to a user (preferably a child) whereby said user's attention to the audio book is directed by interaction with the wirelessly communicative cuddly toy and aptitude in reading is encouraged and reinforced.

The present wirelessly communicative cuddly toy 10, therefore, includes a stuffed animal toy 20 having a motorized, articulated robotic interior member 30 surrounded by flocculent stuffing material 221. The wirelessly communicative cuddly toy 10, therefore, is devised to resemble an animal, such as, for example, in various embodiments, a bear, a lion, a zebra, a monkey, and other such animals as are appropriate for comforting a child.

The robotic interior member 30 includes an articulated head member 40 disposed to animate a mouth 24 of the stuffed animal toy 20 and a speaker 42 disposed to play audio signals relayed by a transceiver 70. Audio executed on a proximal peripheral device 100 is thereby playable through the speaker 42 on the robotic interior member 30 and the articulated head member 40 animates the stuffed animal toy 20 in simulation of verbal communication with a user, as will be further described below.

Figure 2:
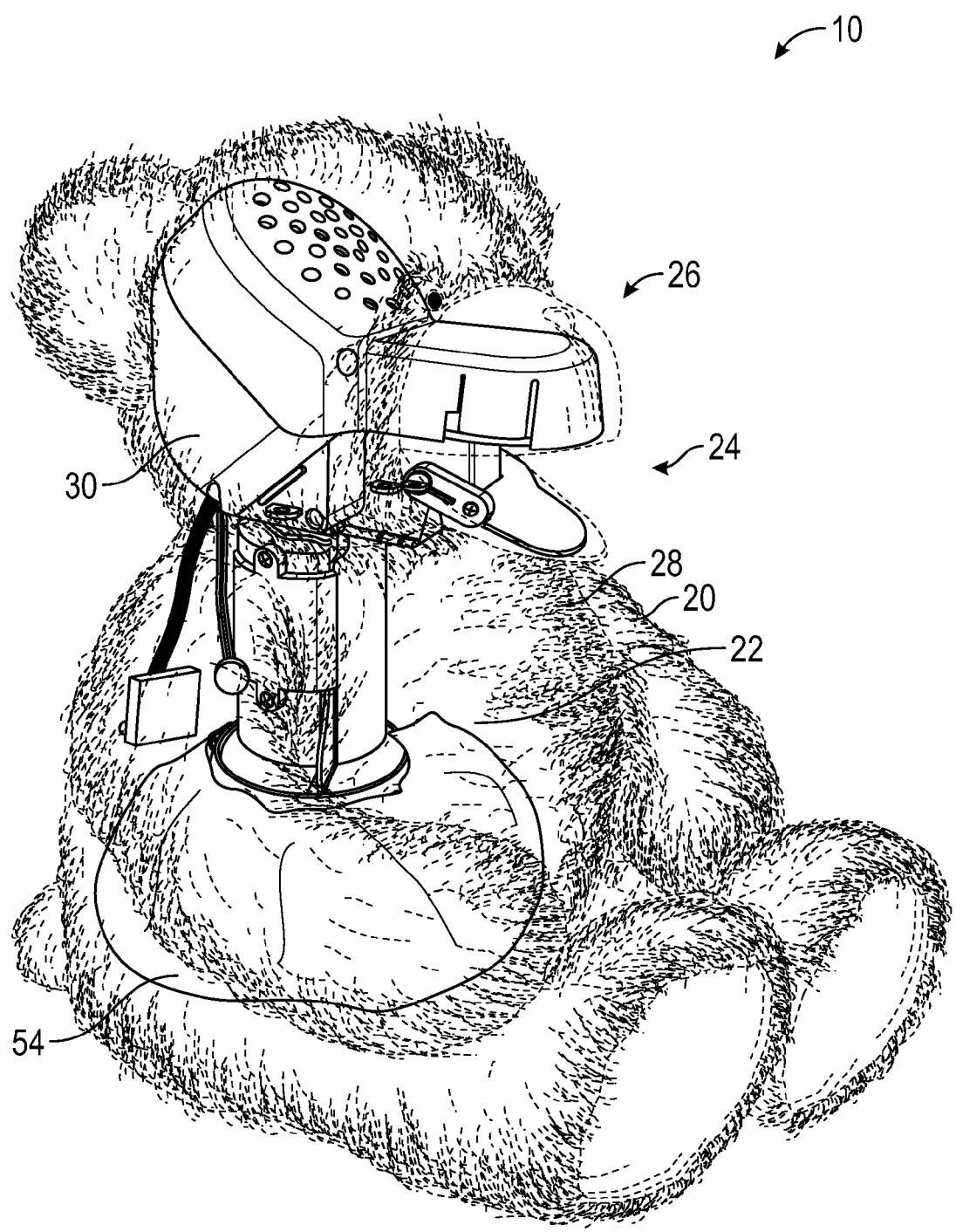
FIG. 2 is an elevation view of an example embodiment of the robotic interior member disposed inside a stuffed animal toy

The articulated head member 40 includes a snout member 44 projected anteriorly upon an anterior lobe 46, said snout member 44 disposed to maintain shape of a facial portion 26 of the stuffed animal toy 20 (see FIG. 2). A hinged jaw member 48 is pivotally disposed underlying the snout member 44, said hinged jaw member 48 having an axle member 50 disposed in operational communication with a first electric motor 52 disposed in the anterior lobe 46 (see for example FIG. 1). The hinged jaw member 48 is thereby rendered moveable between a raised position, abutting the snout member 44, and a lowered position, angled obtusely away from the snout member 44. Movement of the hinged jaw member 48 thus controls action of the mouth 24 of the stuffed animal toy 20, whereby speech is simulated.

The articulated robotic interior member 30 further includes a hollow elongate central portion 32 vertically disposed centrally interior to the stuffed animal toy 20 (see FIG. 2). The elongate central portion 32 is disposed centrally interior to the stuffed animal toy 20 to maximize the amount of flocculent stuffing material 22 that surrounds it whereby cuddliness of the stuffed animal toy 20 is maximally retained. The elongate central portion 32 comprises a conduit for the necessary wiring and motorized portions of the present invention required to animate the torso 28 of the stuffed animal toy 20, as will be described presently.

The elongate central portion 32 includes an uppermost end 34 and a lowermost end 36. A spherical member 38 is disposed at the lowermost end 36 and engaged interior to a base member 60. The base member 60 is disposed to rotatably house the spherical member 38 and accommodate rotation of the spherical member 38 therein. Movement of the spherical member 38 is effected interior to the base member 60, as will be described subsequently, to communicate motion along the elongate central portion 32 of the robotic interior member 30 whereby the torso 28 of the stuffed animal toy 20 is caused to move. The stuffed animal toy 20 is thereby enabled some semblance of movement and gesture synchronized with the movement of the hinged jaw member 48 to emulate movements associated with speech.

A second electric motor 62 is disposed within the elongate central portion 30, said second electric motor 62 disposed to drive an axle 64 rotationally engaged by the motor 62. A gear pulley 66 is disposed in operational communication with the axle 64 whereby rotational movement of the axle 64 is communicable to each of a first rotational element 80 and a second rotational element 90 disposed upon the spherical member 38 at the lowermost end 36.

The first rotational element 80 includes a first circumferential protuberance 82 disposed projected transversely upon the first rotational element 80 in a position proximal a circumference of the first rotational element 80. The first circumferential protuberance 82 is disposed to engage interior to a first pocket 84 disposed upon an interior surface 68 of the base member 60. The second rotational element 90 is likewise disposed upon the spherical member 38 but upon an opposite side of the spherical member 38 relative the first rotational element 80. The second rotational element 90 is also disposed in operational communication with the gear pulley 66, and includes a second circumferential protuberance 92 disposed projected transversely upon the second rotational element 90 in a position proximal a circumference of the second rotational element 90, but at a relative position diametrically opposed to the relative position of the first circumferential protuberance 82 upon the first rotational element 80. The second circumferential protuberance 92 is likewise disposed to engage interior to a second pocket 94 disposed upon the interior surface 68 of the base member 60.

Activation of the second electric motor 62 effects revolution of each of the first and second rotational elements 80, 90 whereby each of the first and second circumferential protuberances 82, 92 is rotationally engaged interior to each of the first and second pockets 84, 94 disposed upon the interior surface 68 of the base member 60. During revolution of each of the first and second rotational elements 80, 90, the first circumferential protuberance 82 is caused to reach an uppermost position about the circumference of the first rotational element 80, whereby the second circumferential protuberance 92 is simultaneously disposed at a corresponding lowermost position upon the second rotational element 90. The elongate central portion 32 is thereby caused by corresponding rotation of the spherical member 60 to angle to a first side, reaching a maximum first side position when the first circumferential protuberance 82 reaches the uppermost position.

The first circumferential protuberance 82 is subsequently caused to revolve to a corresponding lowermost position upon the first rotational element 80, whereby the second circumferential protuberance 92 is caused to revolve to a corresponding uppermost position upon the second rotational element 90. The elongate central portion 32 is thus moved to a maximum second side position generally opposite the maximum first side position. The elongate central portion 32 is thereby caused to oscillate from side to side as each of the first and second rotational elements 82, 92 is revolved to rotate interior to each corresponding first and second pockets 84, 94 and the spherical member 38 is thereby caused to rotate within the base member 60.

The transceiver 70 is disposed to automatically sync with a proximal peripheral device 100 when the interior robotic member 30 is activated. A welcome message 72 is stored to memory integrated with the interior robotic member 30, said welcome message 72 sounding upon activation of the interior robotic member 30. Once communication with the interior robotic member 30 is approved by appropriate action upon the peripheral device (such as user selection of the device displayed thereupon), the speaker 42 sounds audio files executed upon the peripheral device 100. Audio books, therefore, are playable through the speaker 42 disposed upon the interior robotic member 30 whereby activation of each of the first and second electric motors 52, 62, synchronous with the sounding of the speaker 42, affects the action of speech. The present wirelessly communicable cuddly toy 10 thereby simulates reading to a user.

In the embodiment depicted, the speaker 42 is disposed in the articulated head member 40, whereby audio files played therethrough emanate from the facial portion 26 of the stuffed animal toy 20 and the resemblance to speech is thus strengthened.

Figure 3:
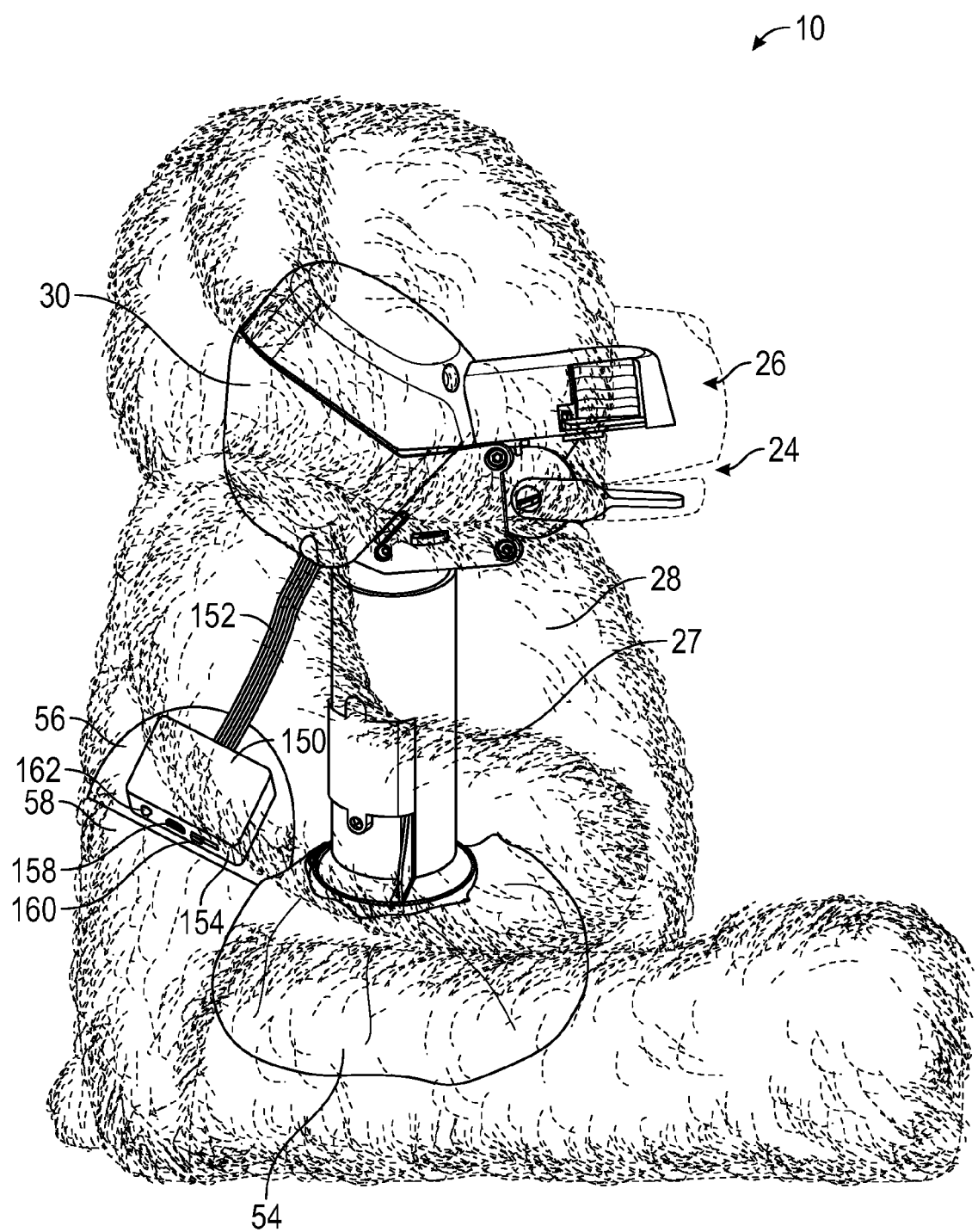
FIG. 3 is a side view of an example embodiment of the robotic interior member.
Figure 4:
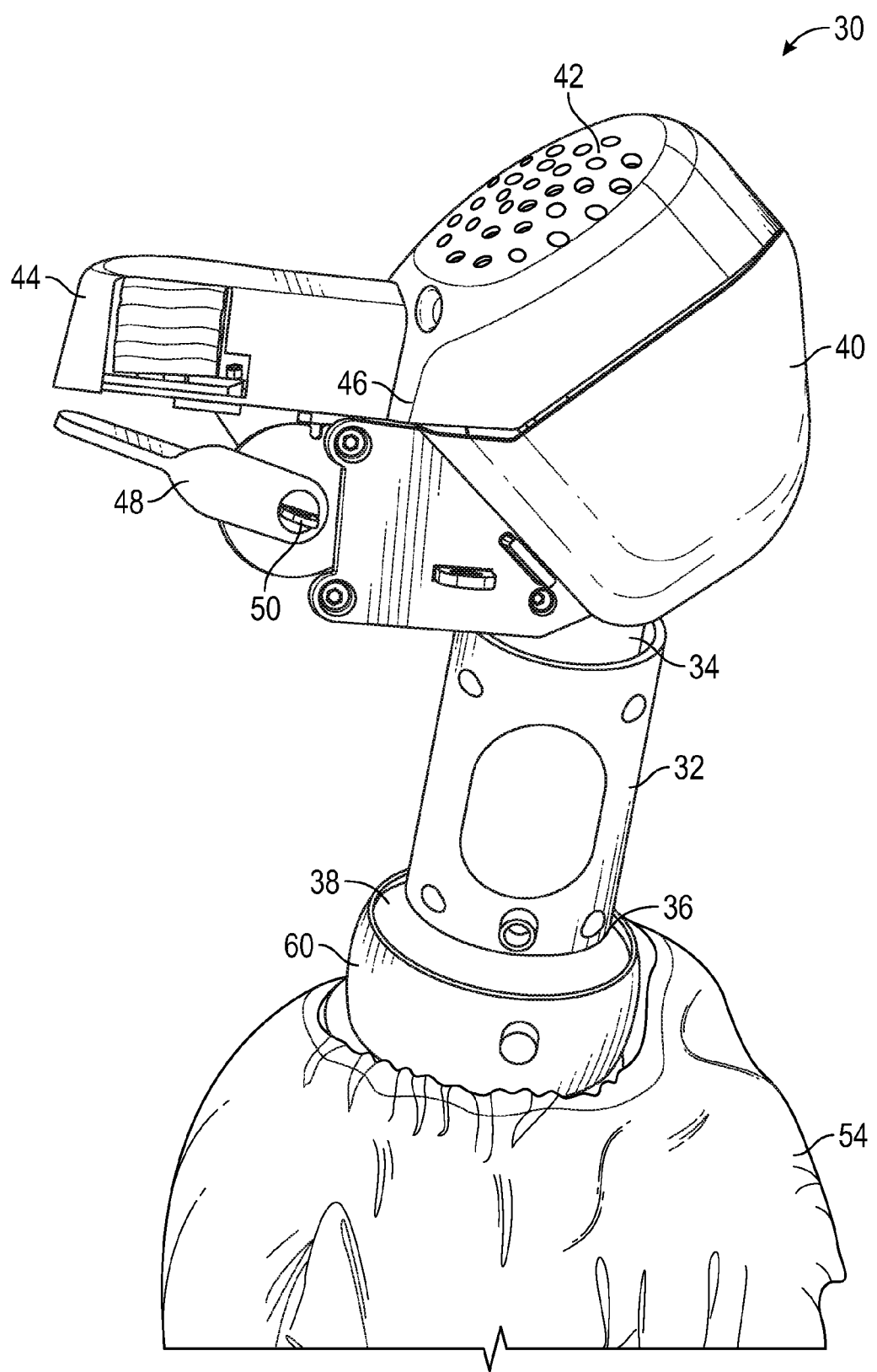
FIG. 4 is a lowered elevation view of an example embodiment of an elongate central portion and an articulated head member disposed upon the robotic interior member.
Figure 5:
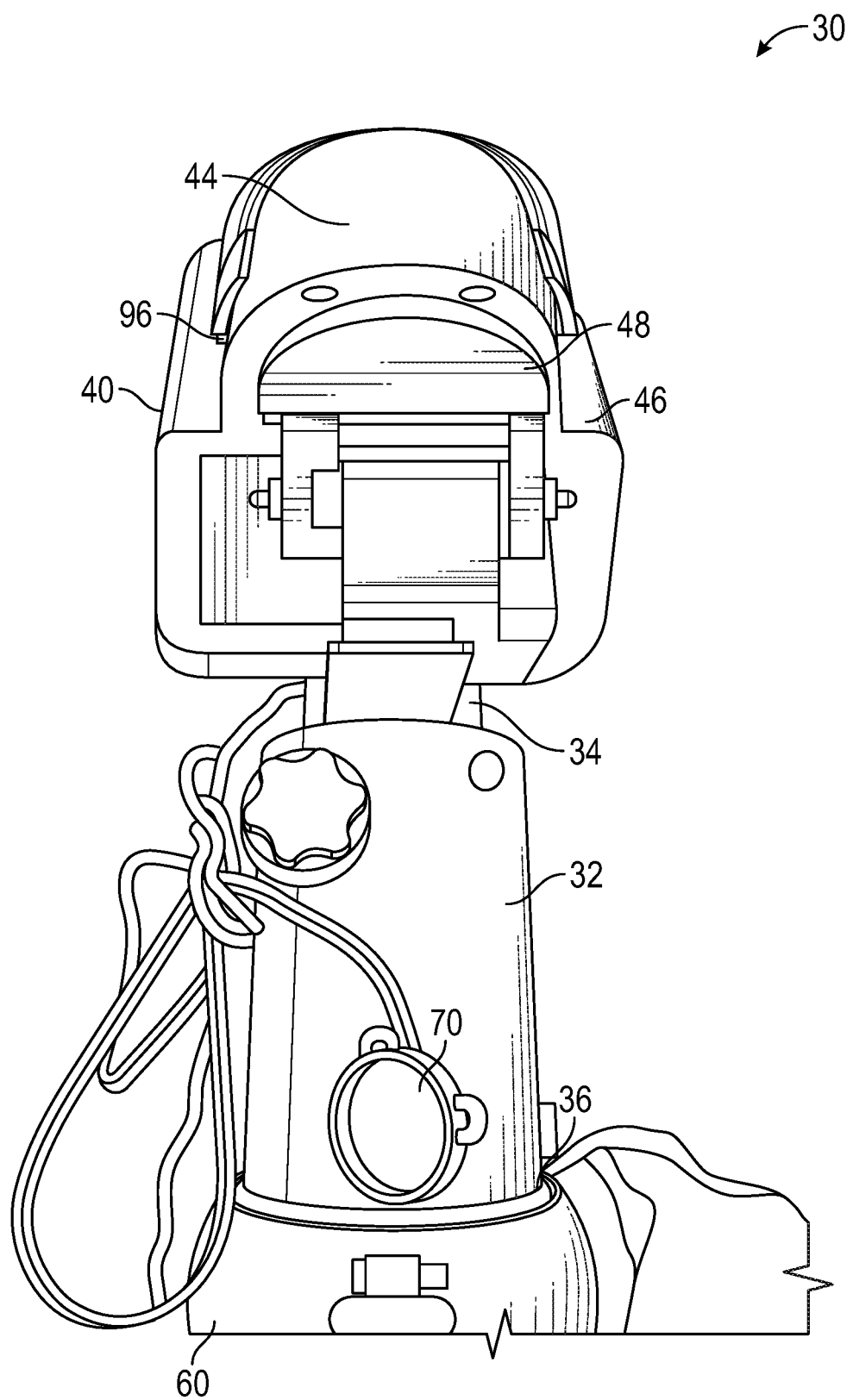
FIG. 5 is an elevation view of an example embodiment of a lowermost end of the elongate central portion exploded from a base member.
Figure 6:
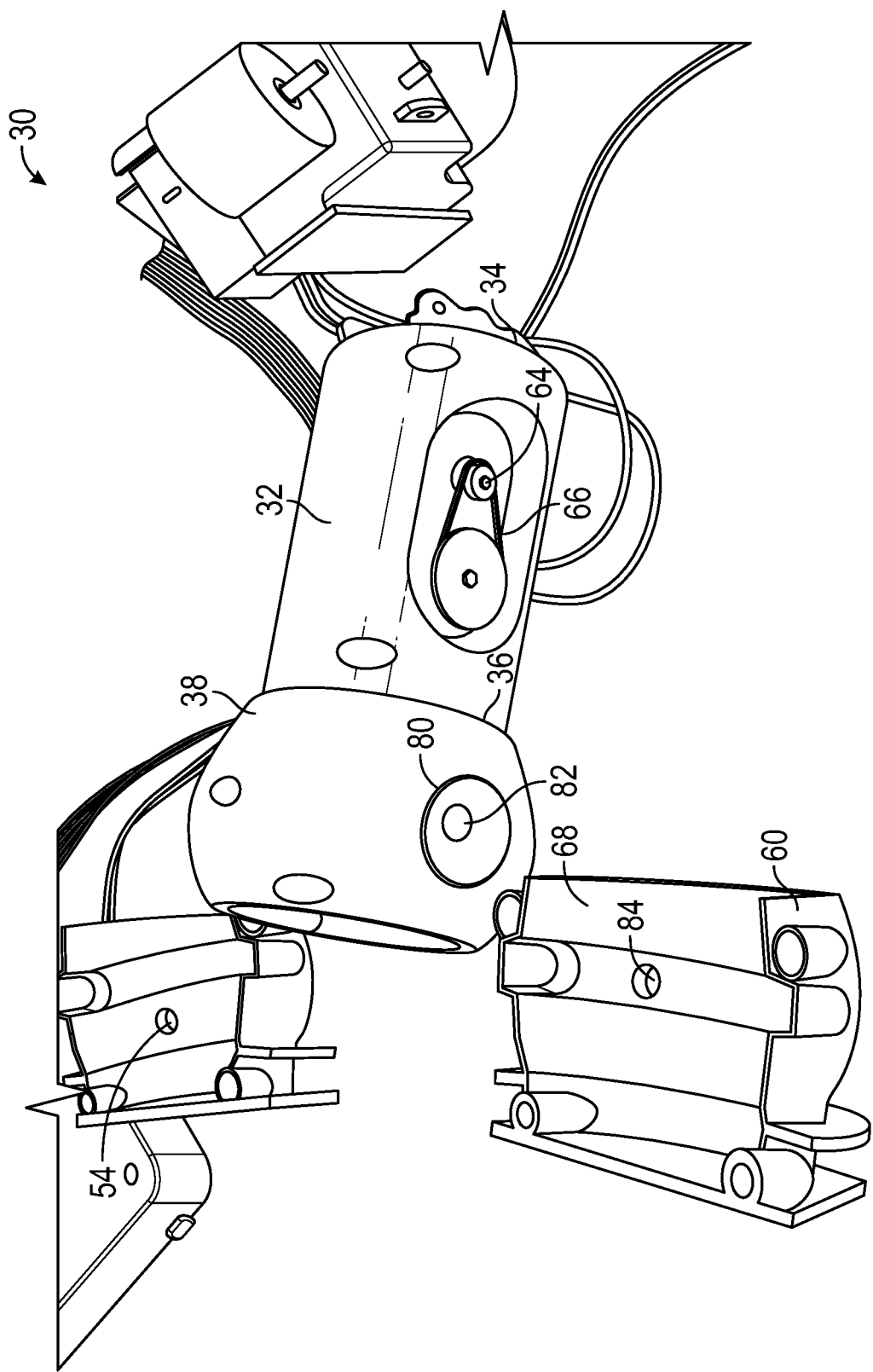
FIG. 6 is an exploded view of an example embodiment of the robotic interior member.
Figure 7:
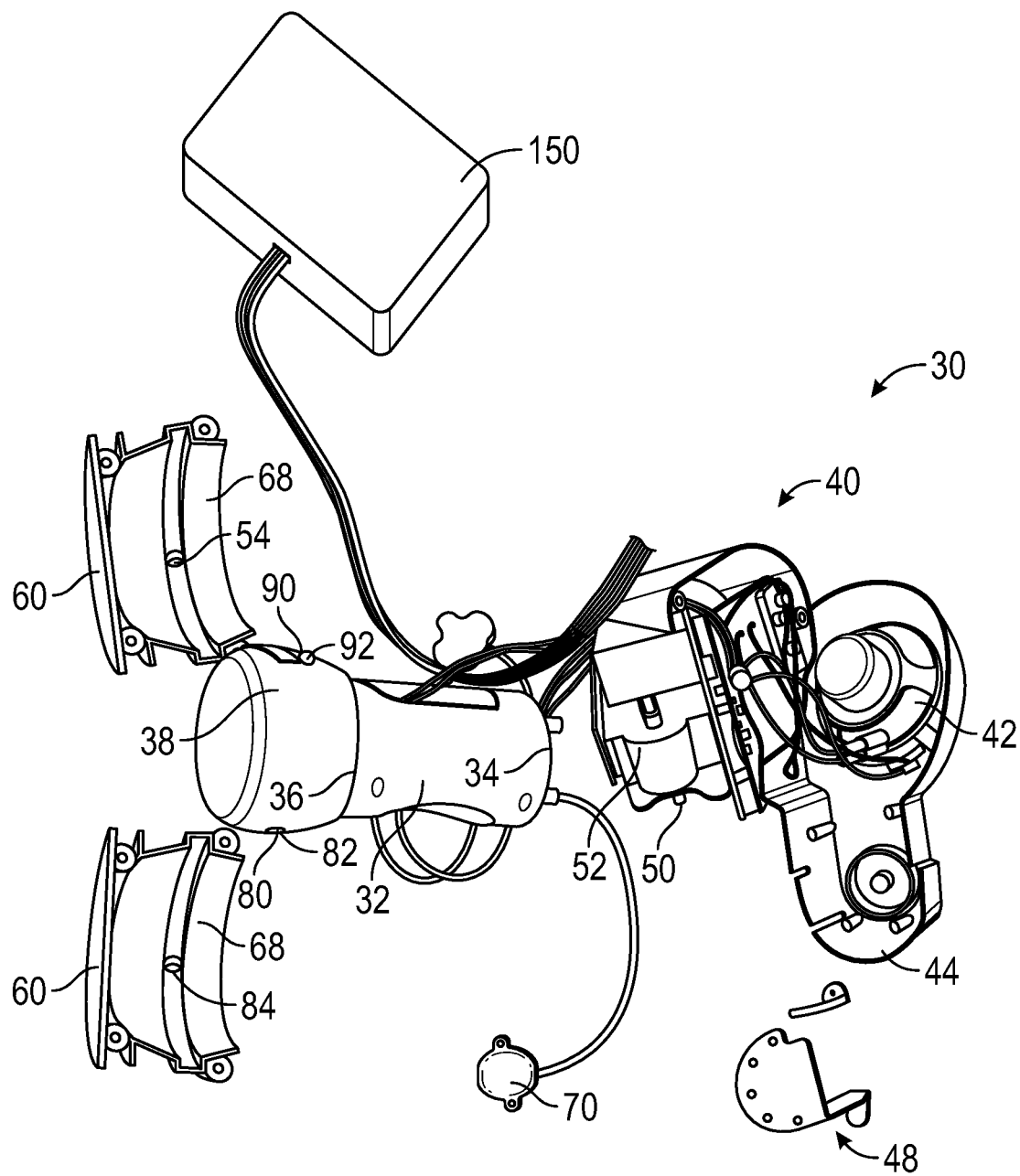
FIG. 7 is a left side elevation view of an example embodiment of the robotic interior member.
Figure 8:
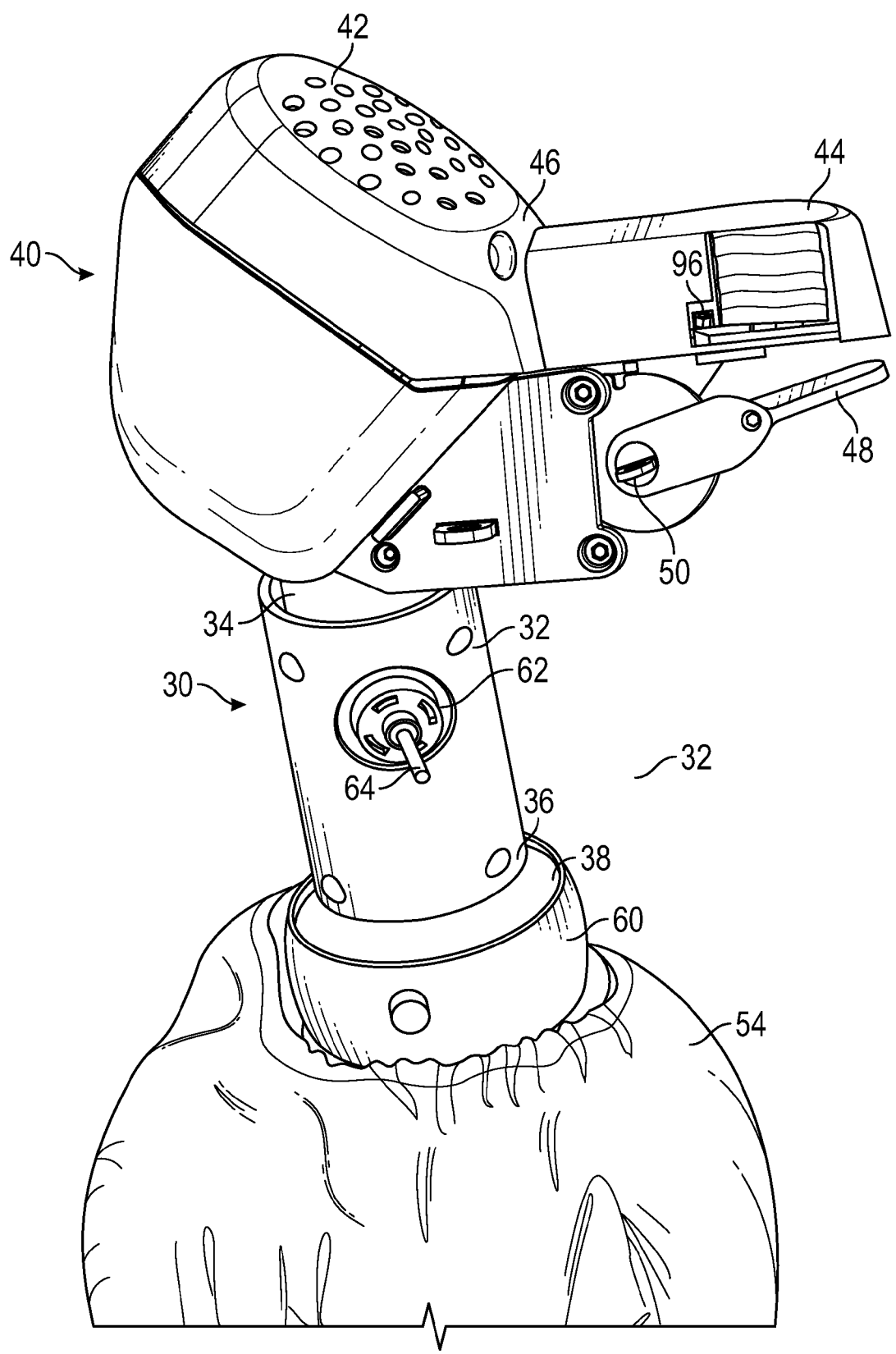
FIG. 8 is a right side elevation view of an example embodiment of the robotic interior member.
Figure 9:
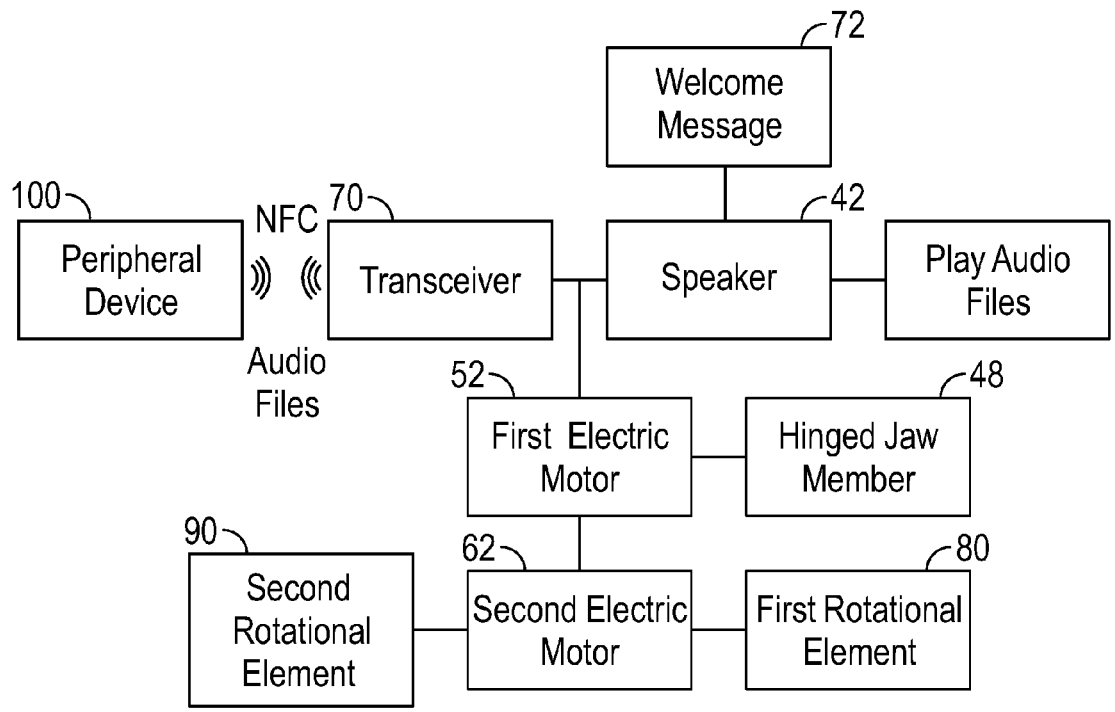
FIG. 9 is a block diagram view of an example embodiment of a wirelessly communicative cuddly toy.
Figure 10:
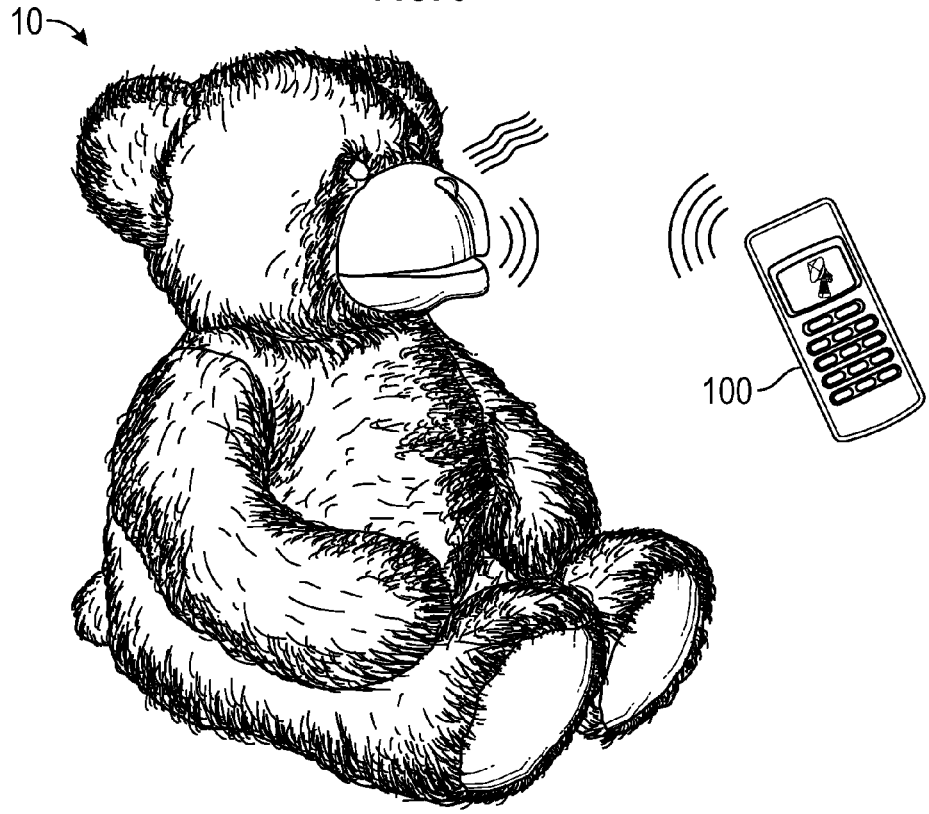
FIG. 10 is an in use view of an example embodiment of a wirelessly communicative cuddly toy reading an audio file displayable as a story upon a peripheral device.

In the embodiment shown in FIGS. 2 and 3, the base member 60 is attached atop a stuffed ball 54 disposed to maintain position of the elongate central portion 32 interior to the torso 28 of the stuffed animal toy 20, whereby the articulated head member 40 remains positioned appropriately to animate the mouth 24 of the stuffed animal toy 20.

An interconnect housing 150 is distally disposed endwise upon a wired circuit 152, said interconnect housing 150 including an exposed portion 154 disposed within a rear pocket 56 accessible to a user through a back 58 of the stuffed animal toy 20. The rear pocket 56 enables the exposed portion 154 of the interconnect housing 150 to be storable inside the stuffed animal toy 20 and not infringe upon the comfort of the stuffed animal toy 20 when cuddled by a user. A rechargeable cell 156 is disposed interior to the interconnect housing 150 in circuit with a charge port 158 disposed exteriorly accessible upon the stuffed animal toy 20 for connection with an existing charging cable. In the embodiment depicted, the charge port 158 is disposed for interconnection with a micro-Universal Serial Bus connector, whereby the present invention 10 is rechargeable connected to a computer or, alternately, an outlet by means of a Universal Serial Bus cable, as is common in the present state of the art.

A switch 160 is also disposed upon the exposed portion 154 of the interconnect housing 150, said switch 160 moveable between a first position and a second position to activate and alternately deactivate the interior robotic member 30. Thus, the interconnect housing 150 enables selective recharging of the rechargeable cell 156 and enables control of the robotic interior member 30 by activation when the switch 160 is moved to the second position and deactivation when said switch 160 is moved to the first position.

In the embodiment depicted herein, the anterior lobe 46 of the articulated head member 40 further includes at least one Light emitting Diode 96 ("LED") illuminable whenever the speaker 42 is activated. The at least one LED 96 therefore signals to a user the device 10 is operable and in use. The at least one LED 96 may be visible when illuminated through the facial portion 26 of the stuffed animal toy 20 to signal to a user normal operation of the device 10 is occurring. Another LED 162 may be disposed upon the interconnect housing 150 to signal to a user that the device 10 has been switched on.

It is further contemplated as part of this disclosure that particular audio files and audio books may be created for specific use with the instant wirelessly communicative cuddly toy 10. Certain audio files and audio books may, for example, make use of selectable voices whereby the present wirelessly communicative cuddly toy 10 is engendered a repeatable voice that lends increased familiarity to the wirelessly communicative cuddly toy 10 and strengthens a perception of a particular personality. Thus alternate embodiments of the present wirelessly communicative cuddly toy 10 may make use of unique and distinct voices, as preferred, according to selection made by a user upon the peripheral device 100.

The present invention 10 further contemplates use of a specific software application runnable upon a peripheral device 100 whereby a user may maintain a digital library of audio files and books, and readily select and execute any audio file for use with a particular one of the present wirelessly communicative cuddly toy 10.

What is claimed is:

1. A wirelessly communicative cuddly toy comprising:
    a stuffed animal toy having a motorized, articulated robotic interior member disposed therein surrounded by flocculent stuffing material, said robotic interior member including:
    a transceiver, said transceiver wirelessly communicable by NFC protocol with an existing peripheral device;
    an articulated head member disposed to animate a mouth of the stuffed animal toy;
    a speaker disposed to play audio signals relayed by the transceiver;
    a hollow elongate central portion having an uppermost end and a lowermost end;
    a spherical member disposed at the lowermost end; and
    a base member disposed to rotatably house the spherical member, said base member accommodative of rotation of the spherical member therein;
    wherein audio executed on the peripheral device is playable through the speaker on the robotic interior member and the articulated head member animates the stuffed animal toy in simulation of verbal communication with a user and wherein movement of the spherical member effected interior to the base member communicates motion along the elongate central portion of the robotic interior member whereby a torso of the stuffed animal toy is caused to move.

2. The wirelessly communicative cuddly toy of claim 1 wherein the speaker is disposed interior to the articulated head member whereby audio signals played through the speaker appear to emanate from a head of the stuffed animal toy.

3. The wirelessly communicative cuddly toy of claim 2 wherein the base member is attached atop a stuffed ball disposed to maintain position of the elongate member interior to the torso of the stuffed animal toy whereby the articulated head member remains positioned appropriately to animate the mouth of the stuffed animal toy.

4. The wirelessly communicative cuddly toy of claim 3 wherein the articulated head member further comprises:
    an ovoid anterior lobe;
    a snout member projected anteriorly upon the anterior lobe, said snout member disposed to maintain shape of a facial portion of the stuffed animal toy; and
    a hinged jaw member pivotally disposed underlying the snout member, said hinged jaw member moveable between a raised position, to abut the snout member, and a lowered position, angled obtusely away from the snout member;
    wherein activation of the speaker simultaneously activates motion of the hinged jaw member between the raised and lowered positions whereby the mandible of the stuffed animal toy appears to move synchronously with audio emanated from the anterior lobe thereby simulating speech.

5. The wirelessly communicative cuddly toy of claim 4 wherein the articulated head portion further comprises a first electric motor disposed therein, said first electric motor disposed to rotationally engage an axle in each of a first and a second direction, whereby the hinged jaw member is moveable between the raised position and the lowered position.

6. The wirelessly communicative cuddly toy of claim 5 wherein the robotic interior member further comprises:
    a second electric motor disposed within the elongate central portion;
    an axle rotationally engaged by the motor;
    a gear pulley disposed in operational communication with the axle;
    a first rotational element disposed upon the spherical member in operational communication with the gear pulley, said first rotational element having:
        a first circumferential protuberance disposed projected transversely upon the first rotational element in a position proximal a circumference of the first rotational element, said first circumferential protuberance disposed to engage interior to a first pocket disposed upon an interior surface of the base member; and
    a second rotational element disposed at the lowermost end upon an opposite side of the spherical member relative the first rotational element, said second rotational element likewise disposed in operational communication with the gear pulley, said second rotational element having:
        a second circumferential protuberance disposed projected transversely upon the second rotational element in a position proximal a circumference of the second rotational element, but at a relative position diametrically opposed to the relative position of the first circumferential protuberance upon the first rotational element, said second circumferential protuberance disposed to engage interior to a second pocket disposed upon the interior surface of the base member;
    wherein activation of the electric motor effects revolution of each of the first and second rotational elements whereby each of the first and second circumferential protuberances is revolved and rotationally engaged interior to each of the first and second pockets disposed upon the interior surface of the base member and the elongate central portion is thereby caused to oscillate from side to side as each of the first and second rotational elements is caused to rotate.

7. The wirelessly communicative cuddly toy of claim 6 wherein the robotic interior member further comprises a:
    an interconnect housing distally disposed endwise upon a wired circuit, said interconnect housing including an exposed portion accessible to a user;
    a rechargeable cell disposed interior to the interconnect housing;
    a charge port disposed exteriorly upon the interconnect housing, said charge port disposed upon the exposed portion and thereby exteriorly accessible upon the stuffed animal toy for connection with an existing charging cable; and a switch disposed upon the exposed portion of the interconnect housing, said switch moveable between a first position and a second position;

wherein interconnect housing enables recharging of rechargeable cell and the robotic interior member is activated when the switch is moved to the second position and deactivated when said switch is moved to the first position.

8. The wirelessly communicative cuddly toy of claim 7 wherein the transceiver automates wireless connection to an appropriate peripheral device by NFC when the switch is moved to the second position.

9. The wireless communicative cuddly toy of claim 8 wherein the robotic interior member is programmed to initiate a welcome message when the switch is moved to the second position.

10. The wirelessly communicative cuddly toy of claim 9 wherein the anterior lobe of the articulated head member further comprises at least one LED illuminable whenever the speaker is activated.

11. The wirelessly communicative cuddly toy of claim 10 wherein the first and second electric motors are activated anytime the speaker sounds an audio signal received by the transceiver whereby movement of the hinged jaw member and oscillation of the elongate central portion are coordinated with audio emanated from the head member.

12. A wirelessly communicative cuddly toy comprising a stuffed animal toy having a motorized, articulated robotic interior member disposed therein surrounded by flocculent stuffing material, said robotic interior member including:
   a transceiver wirelessly communicable by NFC protocol with an existing peripheral device;
   a hollow elongate central portion having an uppermost end and a lowermost end;
   an articulated head member disposed at the uppermost end, said articulated head member disposed to animate a mouth of the stuffed animal toy, said articulated head member including:
      an ovoid anterior lobe;
      a snout member projected anteriorly upon the anterior lobe, said snout member disposed to maintain shape of a facial portion of the stuffed animal toy;
      a hinged jaw member pivotally disposed underlying the snout member, said hinged jaw member moveable between a raised position, to abut the snout member, and a lowered position, angled obtusely away from the snout member;
      a first electric motor disposed to rotationally engage an axle in each of a first and a second direction, said axle communicating motion to effect the hinged jaw member between the raised position and the lowered position;
   a spherical member disposed at the lowermost end;
   a base member disposed to rotatably house the spherical member, said base member accommodative of rotation of the spherical member;
   a second electric motor disposed within the elongate central portion;
   an axle rotationally engaged by the second electric motor;
   a gear pulley disposed in operational communication with the axle;
   a first rotational element disposed upon the spherical member in operational communication with the gear pulley, said first rotational element having:
      a first circumferential protuberance disposed projected transversely upon the first rotational element in a position proximal a circumference of the first rotational element, said first circumferential protuberance disposed to engage interior to a first pocket disposed upon an interior surface of the base member;
   a second rotational element disposed upon the spherical member upon an opposite side of the spherical member relative the first rotational element, said second rotational element likewise disposed in operational communication with the gear pulley, said second rotational element having:
      a second circumferential protuberance disposed projected transversely upon the second rotational element in a position proximal a circumference of the second rotational element, but at a relative position diametrically opposed to the relative position of the first circumferential protuberance upon the first rotational element, said second circumferential protuberance disposed to engage interior to a second pocket disposed upon the interior surface of the base member;
   a stuffed ball disposed to anchor the base member centrally interior the stuffed animal toy;
   a speaker disposed apically atop the articulated head member, said speaker disposed to play audio signals relayed by the transceiver;
   an interconnect housing distally disposed endwise upon a wired circuit, said interconnect housing including an exposed portion accessible to a user;
   a rechargeable cell disposed interior to the interconnect housing;
   a charge port disposed exteriorly upon the interconnect housing, said charge port disposed upon the exposed portion and thereby exteriorly accessible upon the stuffed animal toy for connection with an existing charging cable; and
   a switch disposed upon the exposed portion of the interconnect housing, said switch moveable between a first position and a second position to alternately activate and deactivate the interior robotic member;
   wherein audio executed on the peripheral device is playable through the speaker on the robotic interior member whereby sounding of the speaker simultaneously activates the articulated head member and central elongate portion to animate the stuffed animal toy in simulation of speechifying the audio executed on the peripheral device.

13. The wirelessly communicative cuddly toy of claim 12 wherein the transceiver automates wireless connection to an appropriate peripheral device by NFC when the switch is moved to the second position.

14. The wireless communicative cuddly toy of claim 13 wherein the robotic interior member is programmed to initiate a welcome message when the switch is moved to the second position.

15. The wirelessly communicative cuddly toy of claim 14 wherein the anterior lobe of the articulated head member further comprises at least one LED illuminable whenever the speaker is activated.

16. The wirelessly communicative cuddly toy of claim 15 wherein the first and second electric motors are activated anytime the speaker sounds an audio signal received by the transceiver whereby movement of the hinged jaw member and oscillation of the elongate central portion are coordinated with audio emanated from the head member in simulation of verbal communication.

* * * * *